US012752919B2

(12) United States Patent
Bonnefoy et al.

(10) Patent No.: US 12,752,919 B2
(45) Date of Patent: Oct. 6, 2026

(54) REMOVABLE SEPARATION DEVICE, IN PARTICULAR FOR AN AIRCRAFT CABIN

(71) Applicants: Safran Seats, Plaisir (FR); iD-product, Toulouse (FR)

(72) Inventors: Bastien Bonnefoy, Moissy-Cramayel (FR); Benjamin Cans, Toulouse (FR)

(73) Assignees: Safran Seats, Plaisir (FR); iD-product, Toulouse (FR)

( * ) Notice: Subject to any disclaimer, the term of this patent is extended or adjusted under 35 U.S.C. 154(b) by 245 days.

(21) Appl. No.: 18/710,565

(22) PCT Filed: Nov. 15, 2022

(86) PCT No.: PCT/EP2022/082047
§ 371 (c)(1),
(2) Date: May 15, 2024

(87) PCT Pub. No.: WO2023/088923
PCT Pub. Date: May 25, 2023

(65) Prior Publication Data

US 2026/0167333 A1 Jun. 18, 2026

(30) Foreign Application Priority Data

Nov. 17, 2021 (FR) ....................................... 2112125

(51) Int. Cl.
*B64D 11/06* (2006.01)

(52) U.S. Cl.
CPC ................................ *B64D 11/0606* (2014.12)

(58) Field of Classification Search
CPC ............ B64D 11/0606; B64D 11/0604; B64D 11/0641; B60N 2/91; E06B 3/44;
(Continued)

(56) References Cited

U.S. PATENT DOCUMENTS

2021/0221516 A1 7/2021 Bonnefoy et al.

FOREIGN PATENT DOCUMENTS

WO 2017066559 A1 4/2017
WO WO-2019234041 A1 * 12/2019 ......... B64D 11/0641
(Continued)

OTHER PUBLICATIONS

International Application No. PCT/EP2022/082047, International Preliminary Report on Patentability mailed on May 30, 2024, 15 pages (8 pages of Original Document and 7 pages of English Translation).
(Continued)

*Primary Examiner* — Timothy D Collins
*Assistant Examiner* — Terri L Filosi
(74) *Attorney, Agent, or Firm* — Kilpatrick Townsend & Stockton LLP

(57) ABSTRACT

The present invention relates to a removable separation device for separating off a space, in particular for an aircraft cabin, comprising:
- a fixed frame,
- a movable shutter, and
- two slide connections mounted between the fixed frame and the movable shutter,
- a slide connection extending along a corresponding lateral edge of the movable shutter so as to allow a translational movement of the movable shutter with respect to the fixed frame,
- a slide connection being formed by at least one roller borne by one of the elements among the movable shutter and the fixed frame cooperating with a corresponding rail fixed to the other of the elements among the movable shutter and the fixed frame.

11 Claims, 4 Drawing Sheets

(58) Field of Classification Search
CPC ... E06B 3/4423; E06B 3/4407; E05D 15/165; E05D 15/0665
See application file for complete search history.

(56) References Cited

FOREIGN PATENT DOCUMENTS

| | | | |
|---|---|---|---|
| WO | 2021023581 | A1 | 2/2021 |
| WO | 2021084479 | A1 | 5/2021 |

OTHER PUBLICATIONS

International Patent Application No. PCT/EP2022/082047, International Search Report and Written Opinion, dated Feb. 10, 2023.

* cited by examiner

[Fig. 1]
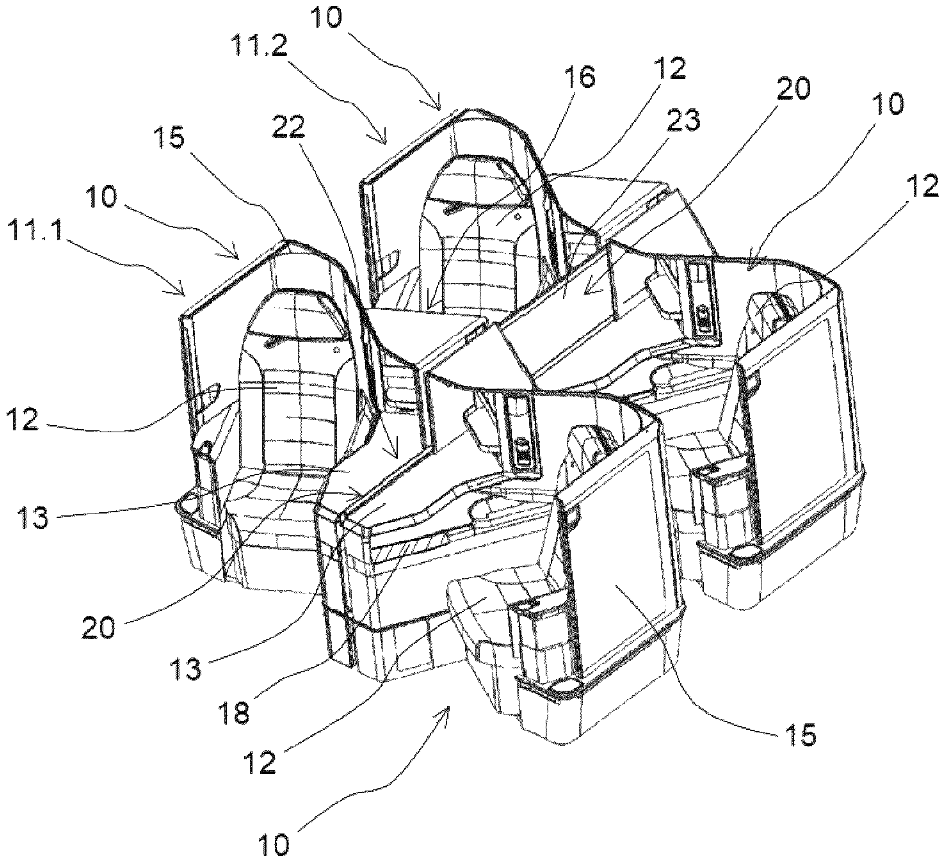
[Fig. 2a]
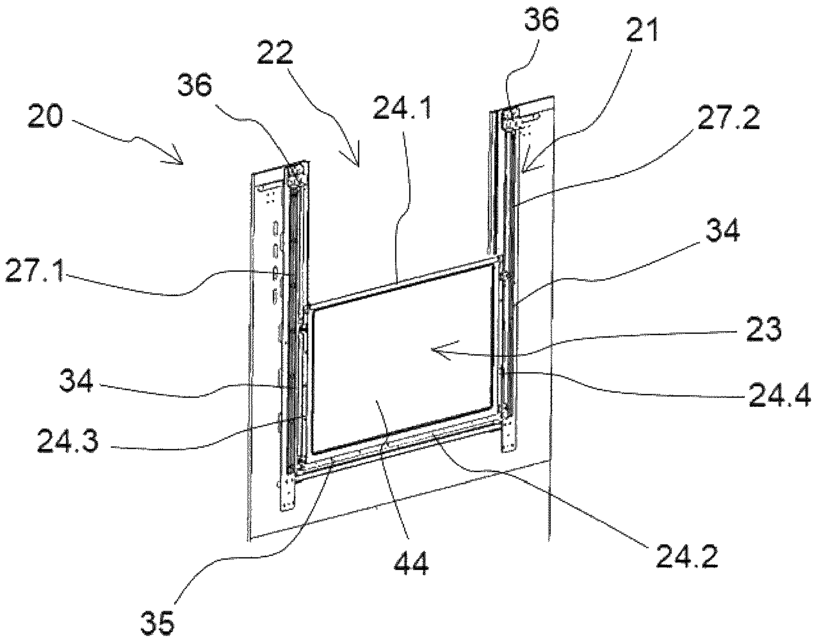

[Fig. 2b]
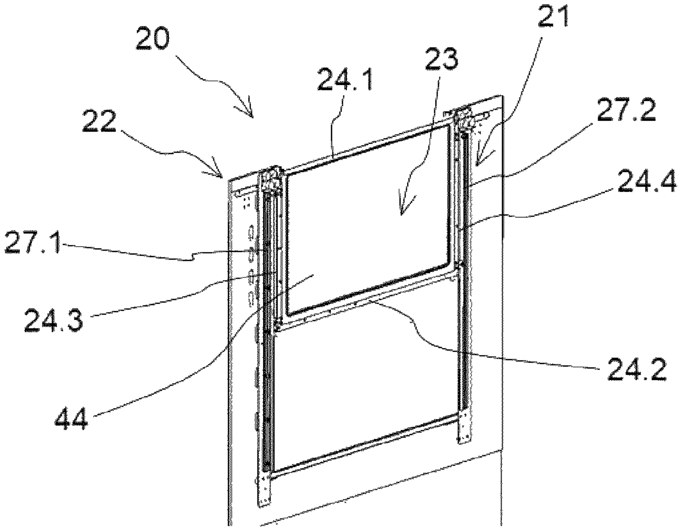
[Fig. 3]
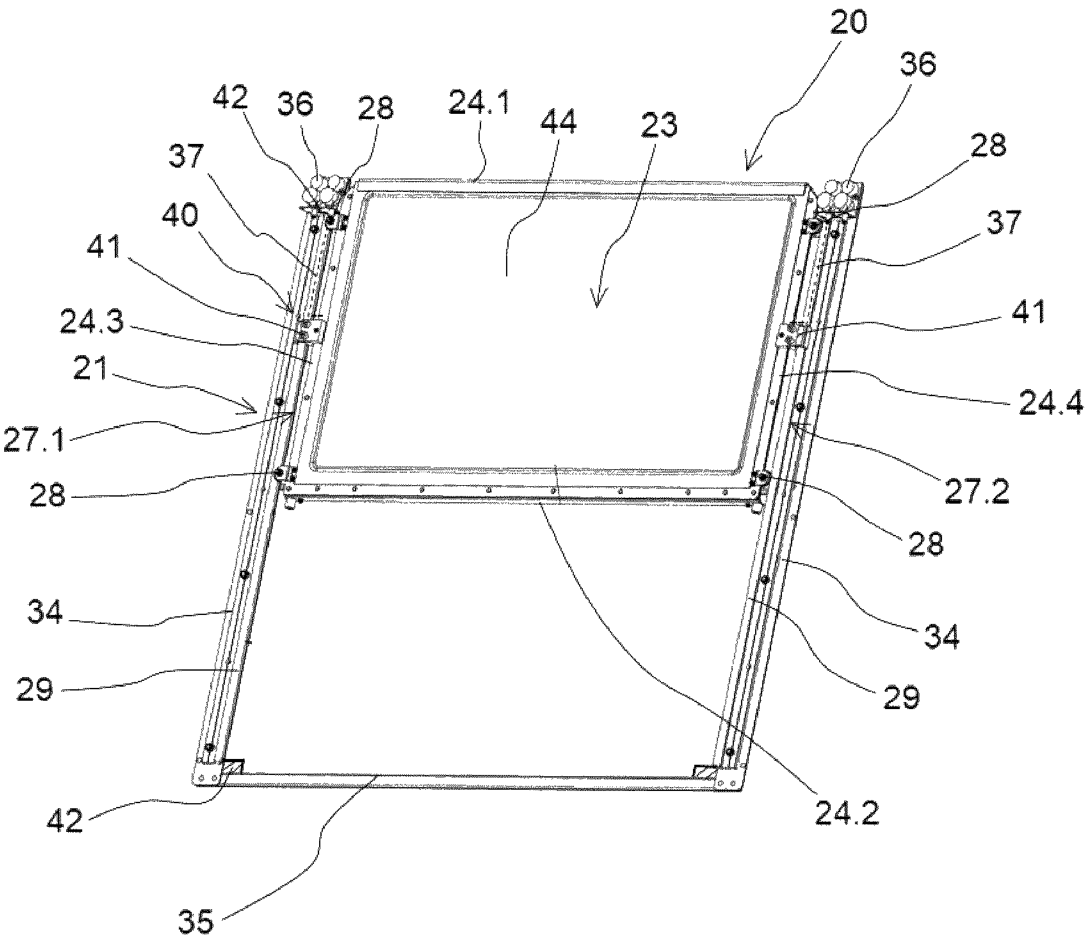

[Fig. 4a]
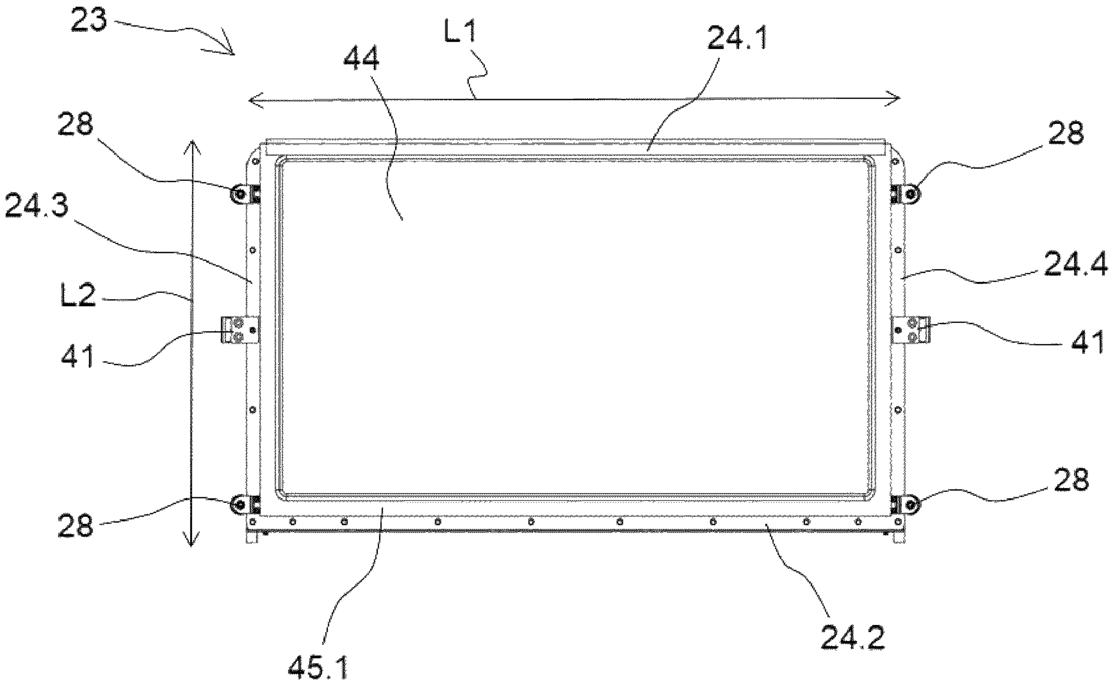
[Fig. 4b]
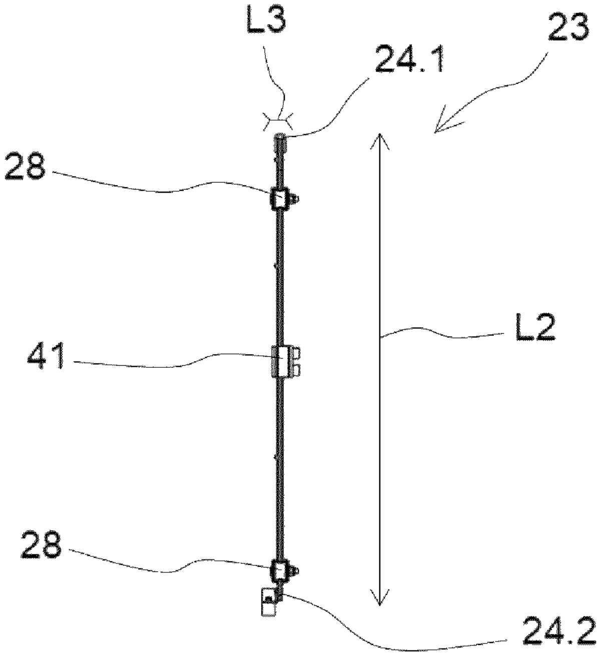

[Fig. 5]
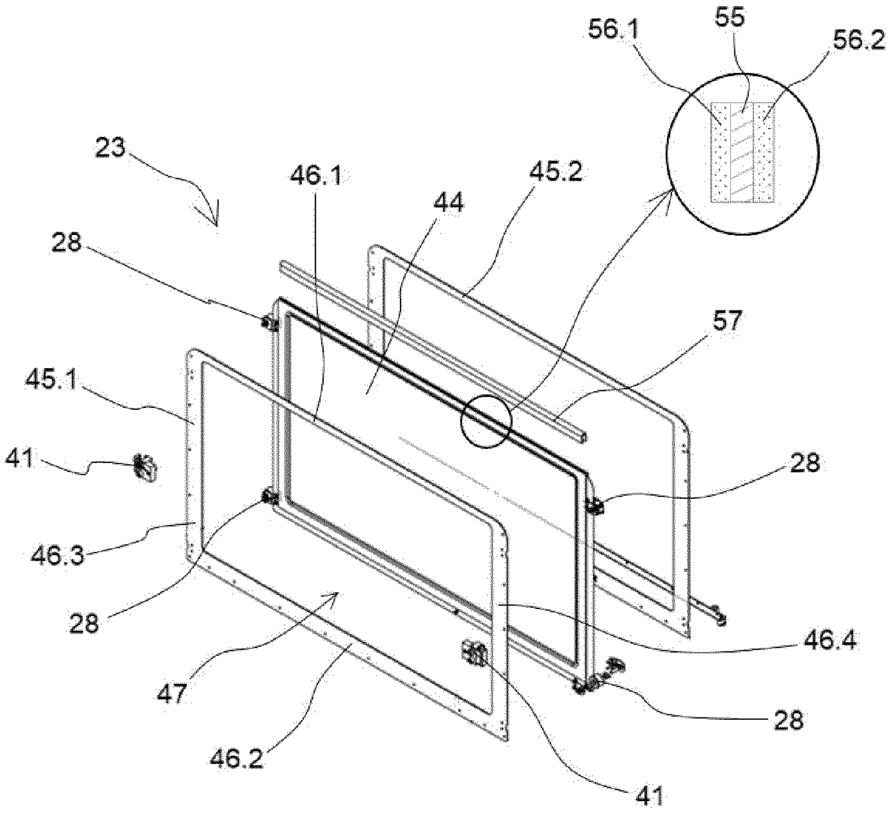
[Fig. 6]
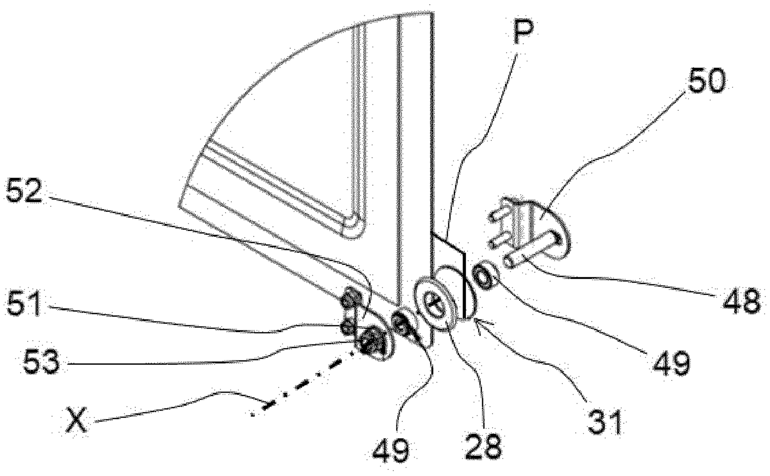

REMOVABLE SEPARATION DEVICE, IN PARTICULAR FOR AN AIRCRAFT CABIN

The present invention relates to a removable separating device especially for an aircraft cabin. The invention finds a particularly advantageous application with aircraft cabins equipped with seat units of "business class" and "first class" type.

In a manner known per se, such a seat unit comprises a seat associated with a side console and a privacy shell extending at least partly around the seat.

The seat offers the passenger different comfort positions, from a position "seating" position up to a "reclining" position, in which the seat defines a substantially horizontal sleeping surface so that the passenger can lie down. Intermediate comfort positions are also offered, such as the "relax" position in which one of the seat backs is strongly inclined. Generally, these intermediate positions are obtained by inclining the pivoting seat back about a horizontal axis and perpendicularly to an axis of extension of the seat. The passenger can then remain on the seat during transitions between the different positions. Generally, the seat consists in particular of the seat back and a seating surface and is likely to include a leg rest and/or a foot rest, which may be fixed or connected to a kinematics of the seat.

In order to guarantee the privacy of the passenger, it is possible to provide a removable separator between two adjacent seats and/or a removable separating wall which can selectively close or clear an access passage to an aisle. The walls of these space closing devices can take the form of a solid panel or a curtain. It is thus possible to create, with the privacy shell, an enclosed space around the seat unit, making it possible to isolate the passenger from the external environment.

For example, document FR3078946 describes a separating device comprising a reel around which a flexible curtain is wound into the stored position. When the flexible curtain is unrolled, it is possible to create with the privacy shell an enclosed space around the seat unit. However, the reel has a significant mass and bulk. The integration of the reel into the seat unit therefore has the effect of reducing the passenger's living space.

The objective of the invention is in particular to effectively remedy this drawback by proposing a removable separating device for a space, in particular for an aircraft cabin, comprising:

- a fixed frame,
- a movable shutter, and
- two slide connections between the fixed frame and the movable shutter,
- at least one of the slide connections extending along a side edge corresponding to the movable shutter so as to authorize a translational movement of the movable shutter relative to the fixed frame,
- at least one of the slide connections being formed by at least one roller carried by one of the elements among the movable shutter and the fixed frame cooperating with a corresponding rail fixed to the other of the elements among the movable shutter and the fixed frame.

The invention thus allows, thanks to the presence of roller slide connections, to eliminate the presence of a reel and therefore to obtain a saving in mass, cost, and size for the removable separating device. The invention also has, due to its compact configuration, the advantage of facilitating maintenance operations by allowing rapid replacement of the separating device in the event of a malfunction.

According to one embodiment of the invention, a cable system is connected to the movable shutter so as to create a tension force on the movable shutter.

According to one embodiment of the invention, said removable separating device comprises a friction device provided with at least one pad for rubbing against the corresponding rail.

According to one embodiment of the invention, the roller has a cylindrical shape and is provided with a groove extending along its circumference, the rail being inserted inside the groove of the roller.

According to one embodiment of the invention, the movable shutter comprises a flexible panel between two frames made of a rigid material, in particular a metallic material or a rigid plastic material.

According to one embodiment of the invention, the roller is mechanically connected to the frames.

According to one embodiment of the invention, the flexible panel is composed of a central panel made of a flexible material, such as fabric, and two covering panels on either side of the central panel.

According to one embodiment of the invention, said removable separating device comprises stops for stopping the movable shutter respectively in a stored position and in a deployed position.

According to one embodiment of the invention, the roller is mounted on a threaded rod forming an axis of the roller, two washers being arranged respectively on either side of the roller.

According to one embodiment of the invention, the threaded rod comes from a first fixing ear, the threaded rod being inserted inside an opening of a second fixing ear associated with a nut cooperating with the threaded rod.

The invention also relates to a seat unit comprising a seat, a console, and a removable separating device as previously defined inside a housing in a wall of the console.

The invention further relates to an assembly comprising two seat units and a removable separating device as previously defined between the two seat units so that a space between the two seat units can be selectively closed or cleared.

The present invention will be better understood and other characteristics and advantages will become apparent on reading the following detailed description comprising embodiments given by way of illustration with reference to the appended figures, presented by way of non-limiting examples, which may be used to complete the understanding of the present invention and the presentation of its realization and, if necessary, contribute to its definition, wherein:

FIG. 1 is a perspective view of several seat units which can be separated two by two by a removable separating device according to the invention;

FIGS. 2*a* and 2*b* are perspective views of a removable separating device according to the invention inside a housing in a wall of a console and shown respectively in the stored position and deployed position;

FIG. 3 is a detailed perspective view of a removable separating device according to the invention;

FIGS. 4*a* and 4*b* respectively show front and side views of a movable shutter according to the invention;

FIG. 5 is an exploded perspective view of movable shutter of a removable separating device according to the invention;

FIG. 6 is an exploded perspective view of a fixing device for a guide roller.

It should be noted that the common structural and/or functional elements to the different embodiments may have the same references. Thus, unless otherwise stated, such elements have identical structural, dimensional and material properties.

Furthermore, in the remainder of the description, the relative terms of the type “horizontal”, “vertical”, “upper”, “lower”, are understood by reference to the common meaning that a passenger on a seat which a removable separating device according to the invention is associated with would give them.

FIG. 1 Shows Four Seat Units 10, Namely Two Sets 11.1, 11.2 of two seat units 10 behind one another. Of course, in an aircraft cabin, the number of sets 11.1, 11.2 of seat units 10 behind one another in the form of a column may be greater than two. It is also possible to form columns of several individual seat units 10.

A seat unit 10 comprises at least one seat 12 associated with a side console 13 extending along one side of the seat 12. A shell 15 extends at least partly around the seat 12 so as to delimit an enclosed space around the passenger. Such a configuration makes it possible to guarantee the privacy of the passenger on the seat 12. A video screen 16 of a multimedia system or IFE (Inflight Entertainment System) can be installed on a rear part of the privacy shell 15.

The seat unit 10 may also usually include a meal flap 18 movable between a stored position (corresponding to that shown in the figures) in which the meal flap 18 is inside a housing in the console 13 and a deployed position in which the meal flap 18 is outside the housing.

The seat 12 is advantageously provided with kinematics allowing it to move between a “seating” position in which the seat 12 is configured to define a seating position of a passenger, and a “lying” position in which the seat 12 is configured to define a sleeping surface for the passenger, advantageously substantially horizontal.

A removable separating device 20 is arranged between two adjacent seat units 10 so that a space between the two seat units 10 can be selectively close in order to give privacy to the passengers or clear this space in the case a passenger wishes to communicate with her/his neighbor.

More precisely, as can be seen in FIGS. 2*a* and 2*b*, the removable separating device 20 comprises a fixed frame 21 and a movable shutter 23. The fixed frame 21 is intended to be mounted inside a housing 22 made in a console 13 (see FIG. 1). The movable shutter 23 has an upper edge 24.1, a lower edge 24.2, and two opposite side edges extending between the upper edge 24.1 and the lower edge 24.2.

Two slide connections 27. 1, 27.2 are mounted between the fixed frame 21 and the movable shutter 23. A slide connection 27.1, 27.2 extends along a corresponding side edge 24. 3, 24.4 of the movable shutter 23 so as to allow a translational movement of the movable shutter 23 relative to the frame 21. The slide connections 27.1, 27.2 thus extend vertically on either side of the movable shutter 23 to allow a translational movement of the movable shutter 23 in a vertical direction.

The shutter 23 is movable in translation relative to the frame 21 between a stored position in which the shutter 23 is mainly inside the housing 22, as shown in FIG. 2*a*, and a deployed position in which the movable shutter 23 is mainly outside the housing 22, as shown in FIG. 2 *b*. Advantageously, the movable shutter 23 extends in a vertical plane when it is in the stored position and when it is in the deployed position.

As can be seen in FIG. 3, a slide connection 27.1, 27.2 is formed by at least one roller 28 carried by the movable shutter 23 and cooperating with a corresponding rail 29 fixed to the frame 21. The rollers 28 can be fixed to two opposite side edges 24.3, 24.4 of the movable shutter 23. Advantageously, two rollers 28 are provided fixed to each side edge 24.3, 24.4 of the movable shutter 23. A first roller 28 is arranged on a upper end of a side edge 24.3, 24.4 and a second roller 28 is arranged on a lower end of a side edge 24.3, 24.4 of the movable shutter 23. Alternatively, it would be possible to fix more than two rollers 28 or a single roller 28 to a side edge 24.3, 24.4 of the movable shutter 23.

As can be seen in FIG. 6, a roller 28, preferably each roller 28, has a cylindrical shape and is provided with a groove 31 extending along its circumference. A rail 29, preferably each rail 29, is inserted inside the groove 31 of at least one corresponding roller 28. The groove 31 could be made in a median plane P of the roller 28 perpendicularly to an axis X of the roller 28. Thus a thickness measured along a radial cutting plane tends to diminish when moving from an axial end of the roller 28 towards the median plane P. The roller 28 can be mounted so as to rotate about its axis when the shutter 23 moves along a rail 29. Alternatively, the roller 28 is fixed in rotation relative to the axis X so as to slide along the rail 29 when the shutter 23 moves.

The frame 21 clearly visible in FIG. 3 may include two studs 34 each provided with a rail 29. The studs 34 can be connected together by a connecting bar 35 so as to have a U shape.

Alternatively, the structure could be inverted, that is to say the rollers 28 could be carried by the frame 21, while the rails 29 could be fixed to the two opposite side edges 24.3, 24.4 of the movable shutter 23.

A cable system 36 is connected to the shutter 23 so as to create a force of tension on the movable shutter 23. This cable system 36 may for example include a cable 37 wound around an axis mounted on a torsion spring making it possible to create the tension force on the shutter 23. The cable system 36 allows to get assistance for raising the shutter 23 to the deployed position. The cable system 36 also makes it possible to maintain the movable shutter 23 in intermediate positions between the stored position and the deployed position. Unlike a jack system, the cable system 36 makes it possible to compact the mechanism and reduce the weight thereof.

A friction device 40 comprises at least one pad 41 for rubbing against the corresponding rail 29. In the example shown, the friction device 40 comprises two pads 41 on either side of the movable shutter 23. In this case, each pad 41 is fixed to a side edge 24.3, 24.4 of the movable shutter 23 and is provided for rubbing against a rail 29. A pad 41 may have a parallelepiped shape and be provided with a groove for receiving a rail 29. A pad 41 may be made of a plastic material. This friction device 40 makes it possible to compensate for the differences in weight between shutters 23 of different dimensions while using a common cable system 36 for all types of shutters 23. Thus, it is guaranteed that a movable shutter 23 larger and therefore heavier than an average shutter can also be maintained in the desired position after releasing the force applied to the shutter 23 by the passenger.

It is possible to provide stops 42 for the movable shutter 23 respectively in the stored position and in the deployed position. Fixed parts of the movable shutter 23 may bear against these stops 42 respectively in the upper and lower part of the frame 21.

As can be seen in FIGS. 4*a* and 4*b*, a movable shutter 23 may have a length L1 between 75 cm and 150 cm, a width L2 between 45 cm and 90 cm and a thickness L3 between 2.5 cm and 5 cm.

As can be seen in FIG. 5, the movable shutter 23 comprises a flexible panel 44 between two frames 45.1, 45.2 made of a rigid material, in particular a metallic material or a rigid plastic material. We thus obtain a stack formed by the following elements: frame 45.1 flexible panel 44 frame 45.2. A frame 45.1, 45.2 has a shape which extends along a circumference of the flexible panel 44. In the example shown, the flexible panel 44 as well as the frames 45.1, 45.2 have a rectangular shape. A frame 45.1, 45.2 thus comprises two longitudinal portions 46.1, 46.2 and two transverse portions 46.3, 46.4 connecting the longitudinal portions 46.1, 46.2 to one another. The frames 45.1, 45.2 delimit an opening 47 in which the flexible panel 44 of rectangular shape extends. It is also possible to provide a stiffening bar 57 extending along a longitudinal edge of the shutter 23.

The components of the movable shutter 23 can be assembled by means of fixing elements, such as screws or rivets, ensuring a mechanical connection between the two frames 45.1, 45.2 and the flexible panel 44 held tight between the two frames 45.1, 45.2.

Alternatively, the flexible panel 44 and the frames 45.1, 45.2 may have a square shape or any other shape adapted to the application and in particular to the size of the space to be closed.

As can be seen in FIG. 6, a roller 28, preferably each roller 28, is mechanically connected to the frames 45.1, 45.2. More precisely, a roller 28, preferably each roller 28, is mounted on a threaded rod 48 forming an axis of the roller 28. Two washers 49 can be placed respectively on either side of the roller 28. The threaded rod 48 comes from of a first fixing ear 50. The threaded rod 48 is inserted inside an opening 51 in a second fixing ear 52 associated with a nut 53 cooperating with the threaded rod 48. The fixing ears 50, 52 can each be fixed on a corresponding frame 45.1, 45.2 via suitable fixing means which may consist of screws or fixing holes for receiving fixing elements, such as screws or rivets.

As illustrated in the insert of FIG. 5, the flexible panel 44 is advantageously composed of a central panel 55 made of a flexible material, such as fabric, and two covering panels 56.1, 56.2 on either side of the central panel 55. The flexible panel 44 is thus constituted by a stack formed by the following elements: "covering panel 56.1—central panel 55—covering panel 56.2". The covering panels 56.1, 56.2 may be made of a plastic material provided with patterns that can be personalized by the airline. Alternatively, the covering panels 56.1, 56.2 could be made of a leather or Alcantara material so as to give a better finish quality to the whole.

The "frame 21—movable shutter 23—slide connections 27.1, 27.2" assembly forms a compact module which can be installed inside a housing 22 in a wall of a console of a seat unit 10. In the event of a malfunction, the entire module can be easily replaced. It should be noted that in the embodiment in which the rails 29 are carried by the movable shutter 23, the amplitude of movement of the module is reduced so that it can be extracted from its housing 22, which allows to replace the module in environments with strong space constraints.

Of course, the different characteristics, variants and/or forms of embodiment of the present invention can be associated with each other in various combinations to the extent that they are not incompatible with one another or exclusive from one another.

Furthermore, the invention is not limited to the embodiments described above and provided solely by way of example. It encompasses various modifications, alternative forms and other variants that those skilled in the art may consider in the context of the present invention and in particular all combinations of the different modes of operation described above, which can be taken separately or in combination.

The invention claimed is:

1. A removable separating device for an aircraft cabin, comprising:

a fixed frame, a movable shutter, which is movable in translation with respect to the fixed frame between a stored position, in which the movable shutter is located predominantly inside a housing, and an extended position, in which the movable shutter is located predominantly outside the housing, said movable shutter having an upper edge, a lower edge, and two side edges extending between the upper edge and the lower edge, and two slide connections mounted between the fixed frame and the movable shutter, at least one of the two slide connections extending along a corresponding lateral edge of the movable shutter so as to authorize a translational movement of the movable shutter relative to the fixed frame, at least one of the two slide connections being formed by at least one roller carried by one of the movable shutter and the fixed frame cooperating with a corresponding rail fixed to the other of the movable shutter and the fixed frame, the movable shutter extends in a vertical plane when it is in the stored position and when it is in the extended position, wherein the roller has a cylindrical shape and is provided with a groove extending along its circumference, the rail being inserted inside the groove in the roller, so that the roller can move in translation along the rail.

2. The removable separating device according to claim 1, wherein a cable system is connected to the movable shutter so as to create a tension force on the movable shutter.

3. The removable separating device according to claim 1, further comprising a friction device provided with at least one pad for rubbing against the corresponding rail.

4. The removable separating device according to claim 1, wherein the movable shutter comprises a flexible panel between two frames made of a rigid material.

5. The removable separating device according to claim 4, wherein the roller is mechanically connected to the two frames.

6. The removable separating device according to claim 4, wherein the flexible panel is composed of a central panel made of a flexible material and two covering panels on either side of the central panel.

7. The removable separating device according to claim 1, further comprising stops for the movable shutter respectively in the stored position and in the extended position.

8. The removable separating device according to claim 1, wherein the roller is mounted on a threaded rod forming an axis of the roller, two washers being arranged respectively on either side of the roller.

9. The removable separating device according to claim 8, wherein the threaded rod comes from a first fixing ear, the threaded rod being inserted inside an opening in a second fixing ear associated with a nut cooperating with the threaded rod.

10. A seat unit comprising a seat, a console, and a removable separating device as defined according to claim 1 mounted inside a housing in a console wall.

11. An assembly comprising two seat units and a removable separating device as defined according to claim 1 between the two seat units so that a space between the two seat units can be selectively closed or cleared.

* * * * *